United States Patent
Ishitani et al.

(10) Patent No.: US 11,011,319 B2
(45) Date of Patent: May 18, 2021

(54) ELECTRONIC COMPONENT

(71) Applicant: Panasonic Intellectual Property Management Co., Ltd., Osaka (JP)

(72) Inventors: Shinji Ishitani, Hyogo (JP); Tatsuo Sasaoka, Osaka (JP); Renki Yamazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/299,786

(22) Filed: Mar. 12, 2019

(65) Prior Publication Data

US 2019/0333707 A1  Oct. 31, 2019

(30) Foreign Application Priority Data

Apr. 25, 2018  (JP) .............................. JP2018-084181

(51) Int. Cl.
*H01G 9/15* (2006.01)
*H01G 9/025* (2006.01)
*H01G 9/10* (2006.01)
*H01G 9/07* (2006.01)
*H01G 9/042* (2006.01)

(52) U.S. Cl.
CPC .............. *H01G 9/15* (2013.01); *H01G 9/025* (2013.01); *H01G 9/042* (2013.01); *H01G 9/07* (2013.01); *H01G 9/10* (2013.01)

(58) Field of Classification Search
CPC ........ H01G 9/26; H01G 9/0029; H01G 9/012; H01G 9/02; H01G 9/025; H01G 9/42; H01G 9/052; H01G 9/07; H01G 9/10; H01G 9/15; H01G 9/042
See application file for complete search history.

(56) References Cited

U.S. PATENT DOCUMENTS

| | | | |
|---|---|---|---|
| 6,191,933 B1 | 2/2001 | Ishigaki et al. | |
| 6,392,869 B2 | 5/2002 | Shiraishi et al. | |
| 7,916,456 B2 | 3/2011 | Mori et al. | |
| 2002/0001169 A1 | 1/2002 | Shiraishi et al. | |
| 2014/0055912 A1* | 2/2014 | Onoue ................... | H01G 9/028 361/525 |

(Continued)

FOREIGN PATENT DOCUMENTS

| | | |
|---|---|---|
| JP | 2002-319522 | 10/2002 |
| JP | 2008-258526 | 10/2008 |

(Continued)

OTHER PUBLICATIONS

English Translation of Chinese Search Report dated Nov. 23, 2020 in corresponding Chinese Patent Application No. 201910131230.4.

*Primary Examiner* — Michael P McFadden
(74) *Attorney, Agent, or Firm* — Wenderoth, Lind & Ponack, L.L.P.

(57) ABSTRACT

An electronic component includes an electronic element that includes a lead portion, a sealing body that seals the electronic element in a state where an end portion of the lead portion is exposed, a first current collector that is formed on the sealing body and is connected to the end portion, and a first terminal that includes a first portion which is sealed in the sealing body and is connected to the first current collector.

20 Claims, 6 Drawing Sheets

(56) References Cited

U.S. PATENT DOCUMENTS

| | | | | |
|---|---|---|---|---|
| 2014/0211371 | A1* | 7/2014 | Summey | H01G 9/15 |
| | | | | 361/524 |
| 2014/0285951 | A1* | 9/2014 | Otani | H01G 9/14 |
| | | | | 361/528 |
| 2017/0133164 | A1 | 5/2017 | Noda et al. | |
| 2017/0345579 | A1* | 11/2017 | Eidelman | H01G 9/08 |
| 2018/0268996 | A1* | 9/2018 | Na | H01G 2/06 |

FOREIGN PATENT DOCUMENTS

| | | |
|---|---|---|
| JP | 2017-092237 | 5/2017 |
| TW | 201812319 | 4/2018 |

* cited by examiner

FIG. 6B
RELATED ART

ELECTRONIC COMPONENT

TECHNICAL FIELD

The technical field relates to an electronic component.

BACKGROUND

In recent years, there has been a demand for reduction in size of an electronic component and improvement of mounting efficiency on a printed circuit board and the like, and a chip formation of the electronic component is being developed. For example, an electrolytic capacitor, which is one of chip components, is required to be reduced in size and height.

Figure 5A:
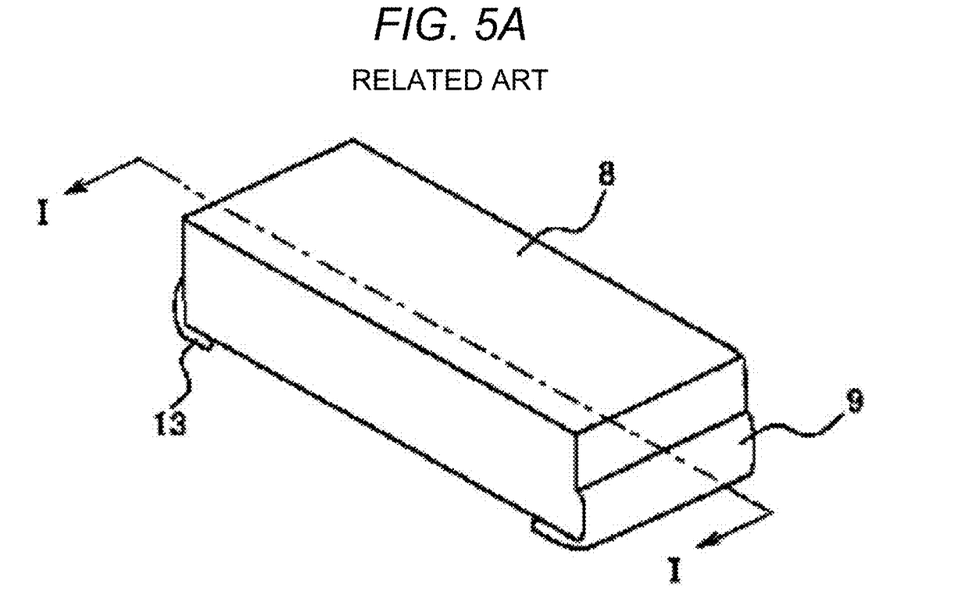
FIG. 5A is a perspective view of a related-art electrolytic capacitor described in Patent Document 1.
Figure 5B:
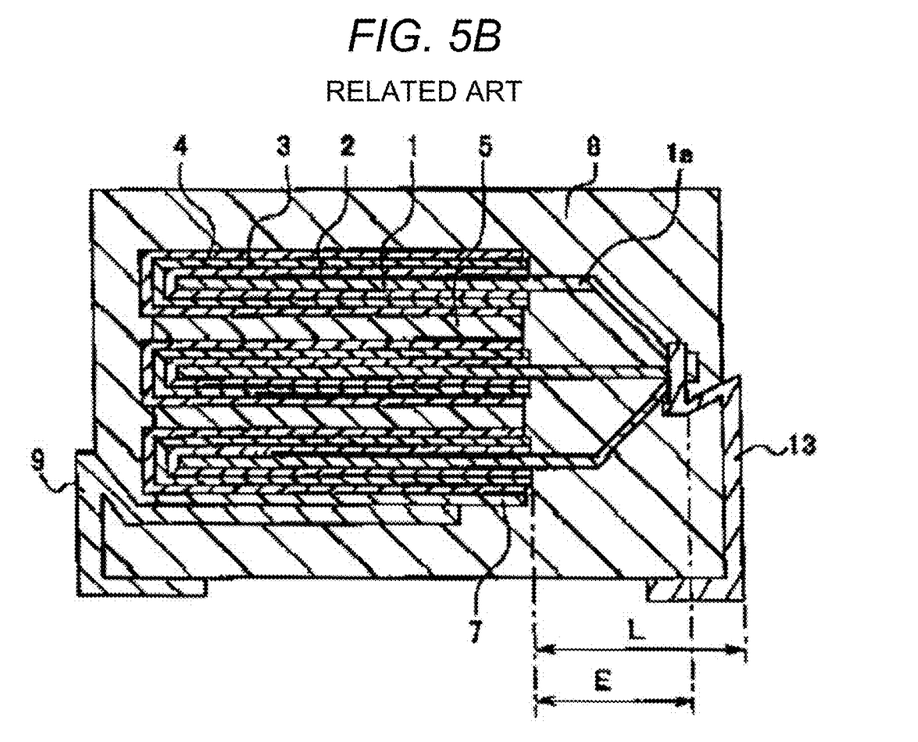
FIG. 5B is a cross section view viewing from the arrow direction of I-I in FIG. 5A.

FIG. 5A is a perspective view showing a related-art laminated solid electrolytic capacitor described in Patent Document 1, and FIG. 5B is a cross section view viewing from the arrow direction of cross section I-I in FIG. 5A. The electrolytic capacitor is generally manufactured as follows.

First, a dielectric layer 2 which is an anodized film of a valve metal, a solid electrolyte layer 3, and a cathode layer 4, are sequentially formed on a prescribed surface of an anode body 1 formed of the valve metal to produce a capacitor unit.

Subsequently, a plurality of capacitor units are laminated via conductive adhesives 5 to produce a unit laminated body.

Next, anode lead portions 1a which are not covered with the solid electrolyte layer 3 and the like of the anode body 1 of all the capacitor units configuring the unit laminated body are bundled and are connected to a first terminal 13, that is, an anode lead terminal by welding. Further, a second terminal 9, that is, a cathode lead terminal is connected to the cathode layer 4 of the capacitor unit configuring a lowermost layer of the unit laminated body via a conductive adhesive 7.

Finally, a sealing body 8 is formed in a state where the first terminal 13 and the second terminal 9 are exposed to an outside.

However, a space used for bundling the anode lead portion 1a of the anode body 1 and welding the anode lead portion 1a to the first terminal 13 is necessary in the electrolytic capacitor, and the electrolytic capacitor cannot meet the demand for reduction in size and large capacitance.

Figure 6A:
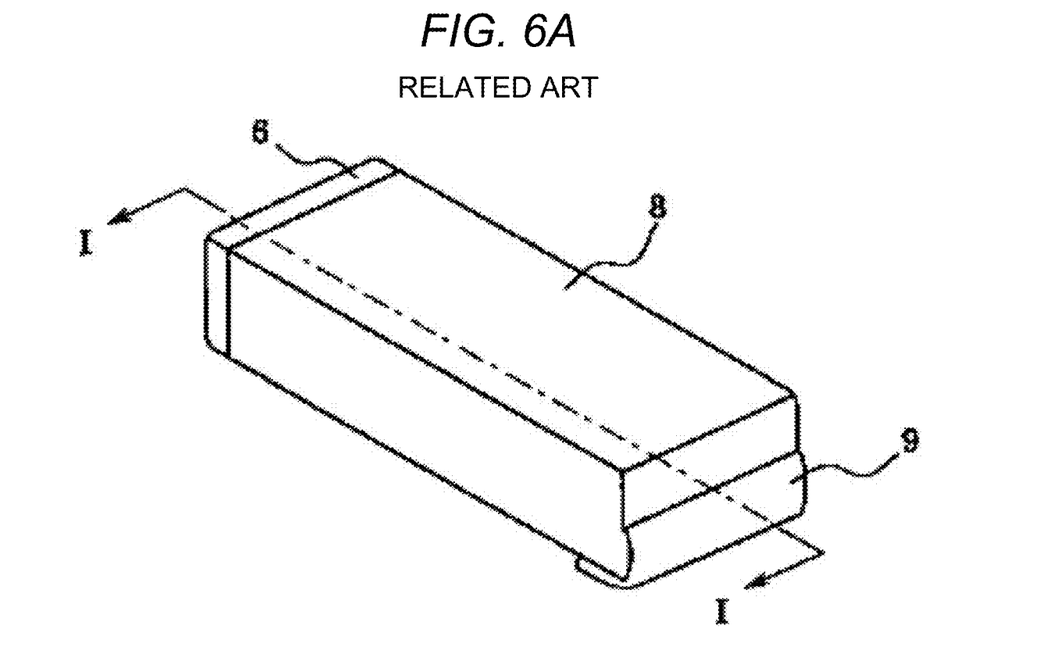
FIG. 6A is a perspective view of a related-art electrolytic capacitor described in Patent Document 1.
Figure 6B:
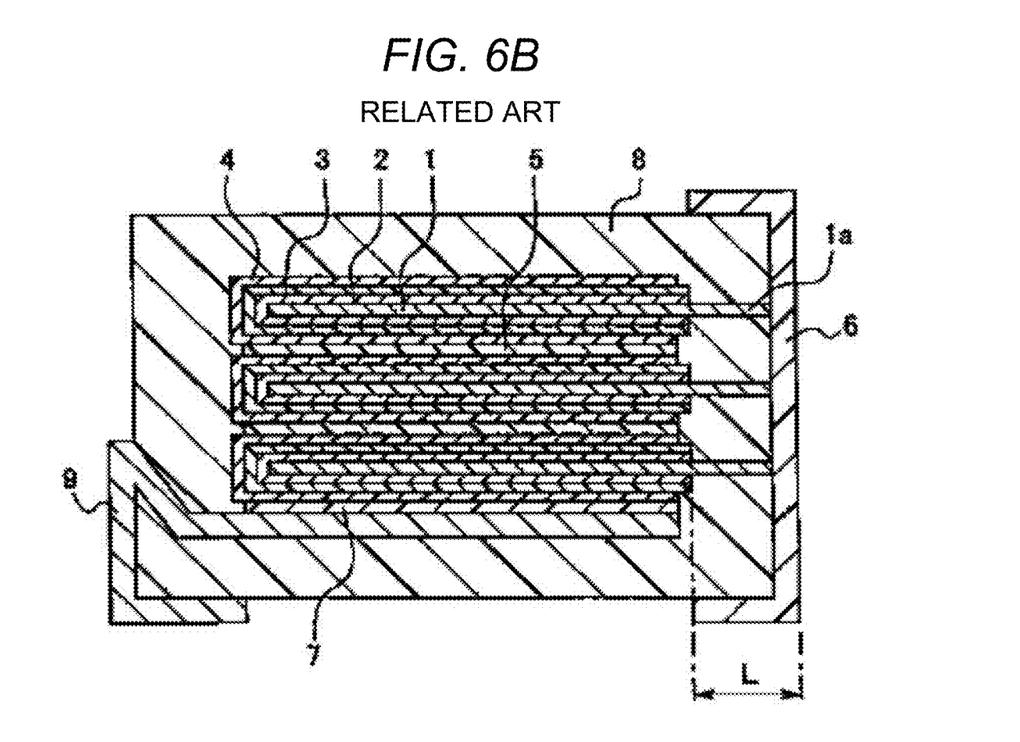
FIG. 6B is a cross section view viewing from the arrow direction of I-I in FIG. 6A.

Therefore, a structure of an electrolytic capacitor corresponding to the reduction in size and the large capacitance has been proposed (see Patent Document 1, for example). FIG. 6A is a perspective view showing a related-art laminated solid electrolytic capacitor, and FIG. 6B is a cross sectional view viewing from the arrow direction of cross section I-I in FIG. 6A.

A plurality of anode bodies 1, which are formed of a valve metal, on which a dielectric layer 2, a solid electrolyte layer 3, and a cathode layer 4 are formed are laminated inside a sealing body 8 in the electrolytic capacitor. A part of the anode body 1 is exposed to an outside of the sealing body 8, and the exposed part is connected to an external electrode 6. With such a structure, a space used for electrically connecting the anode body 1 to the external electrode 6 is reduced to realize reduction in size and large capacitance.

[Patent Document 1] JP-A-2002-319522

SUMMARY

However, an electrolytic capacitor of Patent Document 1 has a structure in which the anode body 1 and the external electrode 6 are connected to each other, and a load from an external environment is transmitted to a connecting portion between the anode body 1 and the external electrode 6. Therefore, for example, when a printed circuit board on which the electrolytic capacitor is mounted is used in an environment with severe temperature changes, a stress generated in the printed circuit board is transmitted to the connecting portion between the anode body 1 and the external electrode 6 via the external electrode 6. Thus, a crack may be generated in the connecting portion. Therefore, the reliability of the related-art electrolytic capacitor may be lowered when being used in a specific environment.

The disclosure is made to solve such a problem and an object thereof is to provide an electronic component in which a lead portion drawn out from an inside of the electronic component and a terminal connected to a printed circuit board are not directly connected, but are connected by a current collector formed on an end surface of the electronic component so as to realize high reliability together with reduction in size and large capacitance.

In order to achieve the above object, an electronic component of the disclosure includes: an electronic element that includes a lead portion, a sealing body that seals the electronic element in a state where an end portion of the lead portion is exposed, a first current collector that is formed on the sealing body and is connected to an end portion, and a first terminal that includes a first portion which is sealed in the sealing body and connected to the first current collector.

According to such a configuration, when the electronic component is mounted on the printed circuit board, a force to be transmitted from the printed circuit board to the electronic component is transmitted to the terminal instead of being directly transmitted to a connecting portion between the current collector and the lead portion exposed from the sealing body, so that high reliability can be realized.

As described above, according to the electronic component of the disclosure, the force transmitted to the connecting portion between the current collector and the lead portion exposed from the sealing body can be reduced, and high reliability together with reduction in size and large capacitance of the electronic component can be realized.

DESCRIPTION OF EMBODIMENTS

Hereinafter, embodiments of the disclosure will be described with reference to the drawings. In the present specification, directions indicated by arrows in FIG. 1 to FIG. 4 will be described as being upper or lower for the sake of convenience. Further, same components are denoted by same reference numerals, and descriptions thereof are omitted.

First Embodiment

Figure 1:
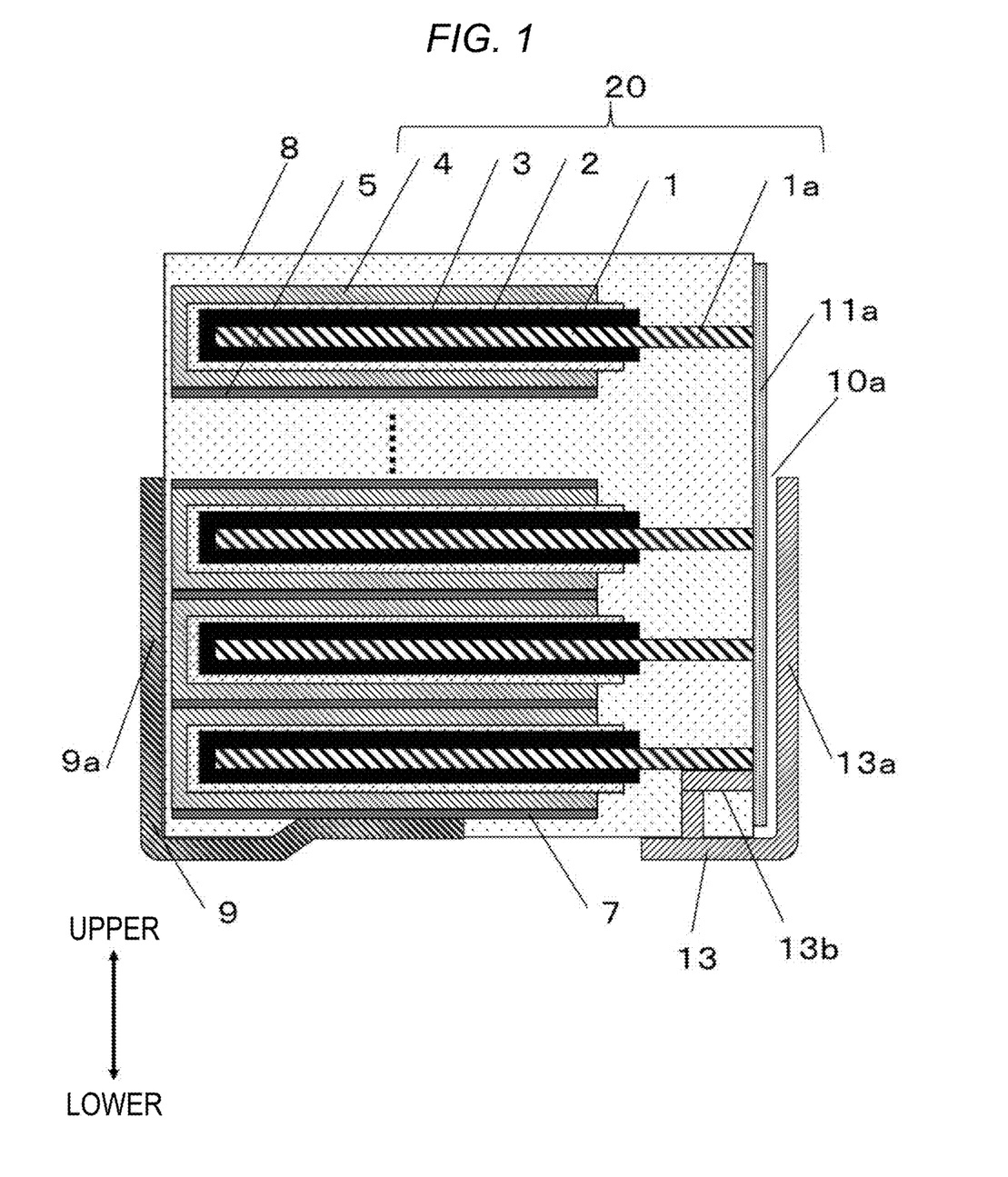
FIG. 1 is a cross section view of an electronic component according to a first embodiment of the disclosure.

FIG. 1 is a cross section view of an electronic component according to a first embodiment of the disclosure. In the present embodiment, the electronic component is used as an electrolytic capacitor in order to facilitate comparison with FIG. 6A and FIG. 6B. Further, in the present embodiment, although an electronic element 20 configuring the electronic component is described as a capacitor element which includes an anode body 1, a dielectric layer 2, a solid electrolyte layer 3, and a cathode layer 4, the electronic element 20 is not limited to the capacitor element.

<Structure>

In FIG. 1, an end portion of an anode lead portion 1a is exposed from one surface of a sealing body 8, and a part of a first portion 13b of a first terminal 13 in the sealing body 8 is also exposed from the same surface of the sealing body 8. A first current collector 11a is formed on the one surface where the anode lead portion 1a and a part of the first portion 13b are exposed, and connects the anode lead portion 1a to the first terminal 13. Therefore, the anode body 1 and the first terminal 13 are electrically connected.

The first terminal 13 includes a second portion 13a that is bent from a lower surface toward a side surface. Therefore, when the first terminal 13 is connected to an electrode of a printed circuit board with a solder and the like, the melted solder can creep up to the side surface of the second portion 13a due to surface tension. As a result, the first terminal 13 and the electrode of the printed circuit board can be firmly connected. Further, there is a vacant space, which is a first gap 10a, between the first current collector 11a and the second portion 13a of the first terminal 13 bent to the side surface such that the first current collector 11a and the second portion 13a are not in direct contact with each other. That is, the second portion 13a of the first terminal 13 bent to the side surface extends to a surface of the first current collector 11a along the sealing body 8 to cover the first current collector 11a, with the first gap 10a formed between the second portion 13a and the first current collector 11a. When the electronic component is mounted on the printed circuit board, a stress generated in the printed circuit board is not directly transmitted to a connecting portion between the anode body 1 and the first current collector 11a by adopting such a configuration.

It is desirable to set a distance between the first current collector 11a and the second portion 13a to 10 μm or more in order to stably process the first current collector 11a and the second portion 13a in a separated state. Further, it is desirable that the distance is 1 mm or less in consideration of miniaturization of the electronic component. In addition, electrical characteristics of the electronic component can be improved by shortening the distance between the first current collector 11a and the second portion 13a bent to the side surface, that is, shortening a length of the first terminal 13.

A material of the first current collector 11a is formed of, for example, a metal which includes any one of aluminum, nickel, copper, silver, gold, tin, palladium, and zinc, which are used as a wiring material of an electronic component.

<Manufacturing Method>

Next, a method of manufacturing the electronic component according to the first embodiment of the disclosure will be described. First, a conductive adhesive 7 is applied, by dispensing or transferring, onto a lead frame formed of one metal plate on which a second terminal 9 and the first terminal 13 are formed. The capacitor element which includes the anode body 1, the dielectric layer 2, the solid electrolyte layer 3, and the cathode layer 4 is mounted thereon.

The capacitor elements are laminated on the lead frame via conductive adhesives 5. Further, a laminated body of the capacitors is formed by repeatedly laminating the capacitor elements in accordance with characteristics required for the electrolytic capacitor.

Next, the laminated body is sealed with the sealing body 8. Related-art techniques such as transfer molding and compression molding are applied for the sealing. The laminated body of the sealed capacitors is separated from the lead frame, and further a surface which includes the anode lead portions 1a and the part of the first terminal 13 is cut by a method such as blade dicing or ultrasonic cutter. Accordingly, the anode lead portions 1a and the part of the first terminal 13 are exposed from the one surface of the sealing body 8.

Further, the first current collector 11a is formed on the cut surface. A method of forming the first current collector 11a is not particularly limited, and the first current collector 11a can be formed by plating, sputtering, thermal spraying, cold spraying, conductive paste applying, and the like which are generally used as a film forming method. The first current collector 11a formed by these methods can exhibit the same effect as each other. After the first current collector 11a is formed, the first terminal 13 is bent along the first current collector 11a. Further, the second terminal 9 is bent along the sealing body 8 to form a fourth portion 9a bent to a side surface. The electronic component is produced by such steps.

Although the laminated body of the capacitors is separated after a sealing step in the first embodiment, the laminated body may be separated before the sealing step, and an order is not particularly determined. Further, the method of forming the first current collector 11a is not limited to the above-described method either.

Although the electronic component is described as the electrolytic capacitor in the first embodiment in order to facilitate comparison with a related-art structure, the disclosure is not limited to the electrolytic capacitor.

Second Embodiment

Figure 2:
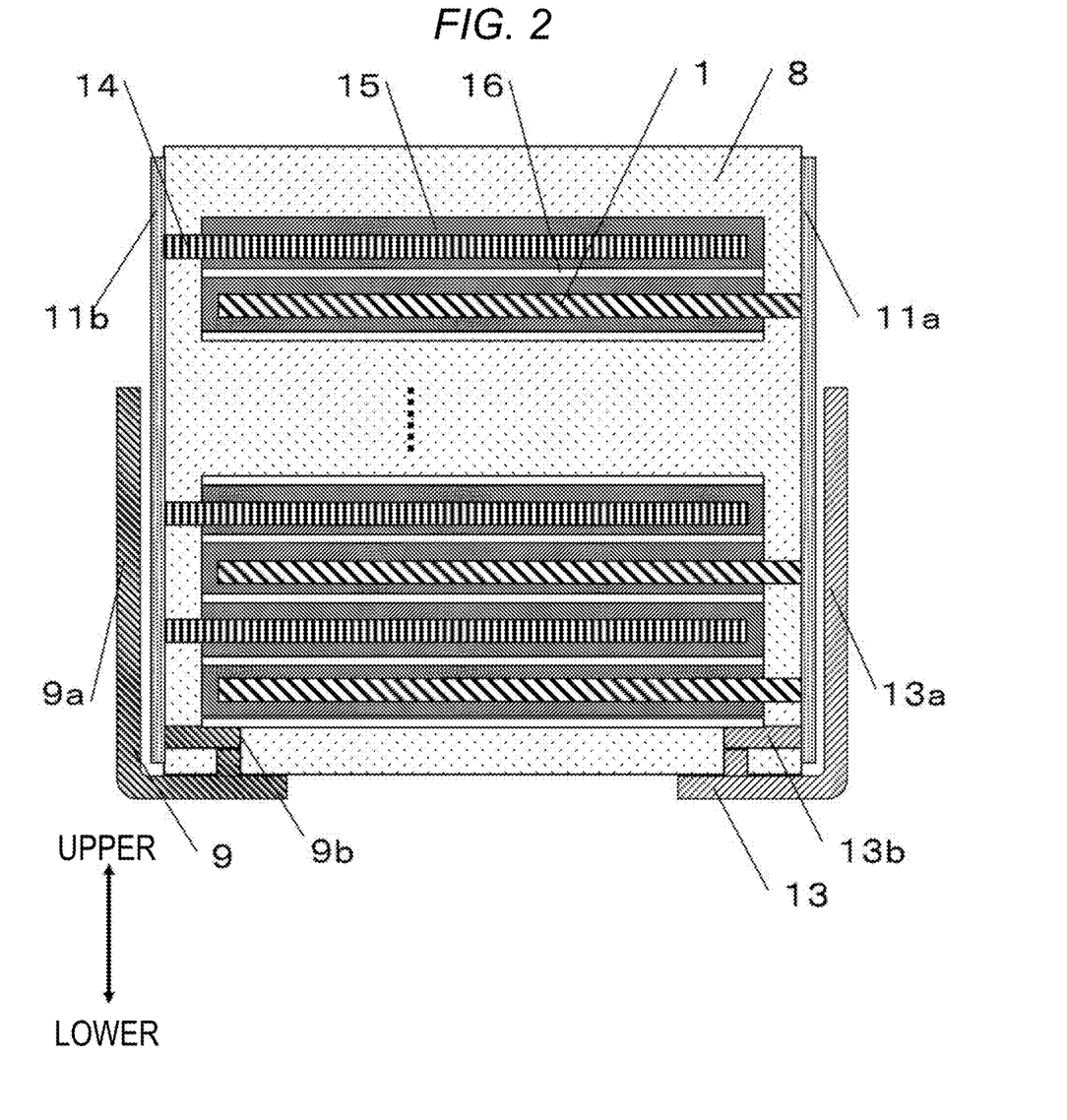
FIG. 2 is a cross section view of an electronic component according to a second embodiment of the disclosure.

FIG. 2 is a cross section view of an electronic component according to a second embodiment of the disclosure. Matters not described are the same as those of the first embodiment.

In addition to configurations according to the first embodiment, the electronic component according to the second embodiment includes, a second current collector 11b disposed at a position facing the first current collector 11a with the sealing body 8 interposed therebetween, and a second terminal 9 of which a part is sealed in the sealing body 8 and the part is connected to the second current collector 11b. Further, the second terminal 9 has a third portion 9b in the sealing body 8 and a fourth portion 9a that is exposed from the sealing body 8 and is bent to the side surface along the sealing body 8.

The fourth portion 9a extends to a surface of the second current collector 11b along the sealing body 8 and covers the second current collector 11b via a second gap 10b. Descriptions of matters similar to those of the first embodiment are omitted.

<Structure>

As shown in FIG. 2, a plurality of anode bodies 1 and cathode bodies 14 formed with an insulating layer 15 are laminated via an adhesive layer 16 inside the sealing body 8.

As shown in FIG. 2, the anode body 1 is exposed from one surface, and the first portion 13b of the first terminal 13 is also exposed from the same surface. The first current collector 11a is formed on the surface from which the anode body 1 and a part of the first portion 13b are exposed, and the anode body 1 and the first terminal 13 are electrically connected by a first current collector 11a.

The cathode body 14 is exposed from the other surface facing the one surface, and a part of the third portion 9b of the second terminal 9, which is the second terminal, is also exposed from the other surface. The second current collector 11b is also formed on a surface from which the cathode body 14 and the part of the third portion 9b of the second terminal 9 are exposed, and the cathode body 14 and the second terminal 9 are electrically connected by the second current collector 11b.

There is a vacant space, which is a first gap 10a, between the first current collector 11a and the second portion 13a bent to the side surface, and the first current collector 11a and the second portion 13a bent to the side surface are not in direct contact with each other. When the electronic component is mounted on a printed circuit board, a stress generated in the printed circuit board is not directly transmitted to a connecting portion between the anode body 1 and the first current collector 11a by adopting such a structure.

There is a vacant space, which is a second gap 10b, between the second current collector 11b and the fourth portion 9a of the second terminal 9 bent to the side surface, and the second current collector 11b and the fourth portion 9a are not in direct contact with each other. When the electronic component is mounted on the printed circuit board, the stress generated in the printed circuit board is not directly transmitted to the connecting portion between the cathode body 14 and the second current collector 11b by adopting such a structure.

A distance between the first current collector 11a and the second portion 13a and a distance between the second current collector 11b and the fourth portion 9a are preferably 10 μm or more and 1 mm or less as in the first embodiment.

Materials of the first current collector 11a and the second current collector 11b are formed of, for example, a metal which includes any one of aluminum, nickel, copper, silver, gold, tin, palladium, and zinc, which are used as a wiring material of an electronic component. It is desirable to use the same material on an anode side and a cathode side in consideration of the productivity of the electronic component. Further, when the anode body 1 and the cathode body 14 are formed of different materials, the material of the first current collector 11a formed on the anode side and the material of the second current collector 11b formed on the cathode side may be formed of different materials in consideration of adhesion to the anode body 1 or the cathode body 14.

A method of forming the first current collector 11a and the second current collector 11b is not particularly limited, and the first current collector 11a and the second current collector 11b can be formed by plating, sputtering, thermal spraying, cold spraying, conductive paste applying, and the like which are generally used as a film forming method.

Although an internal structure of the sealing body 8 is a laminated structure of the anode bodies 1 and the cathode bodies 14 in the second embodiment, the disclosure is not limited to such an internal structure.

Thus, the electronic component can be further miniaturized by forming the first current collector 11a and the second current collector 11b on the two terminals of the anode and the cathode.

<Manufacturing Method>

Next, a method of manufacturing the electronic component according to the second embodiment of the present disclosure will be described. First, the adhesive layer 16 is applied, by dispensing or transferring, onto a lead frame formed of one metal plate on which the second terminal 9 and the first terminal 13 are formed. Then, the anode body 1 formed with the insulating layer 15 is mounted thereon.

Then, the cathode body 14 formed with the insulating layer 15 is laminated on the anode body 1 via the adhesive layer 16. Further, the anode body 1 and the cathode body 14 are repeatedly laminated in accordance with characteristics required for the electronic component.

Next, the laminated body is sealed with the sealing body 8. Related-art techniques such as transfer molding and compression molding are applied for the sealing. The laminated body of the sealed capacitors is separated from the lead frame, and further a surface which includes the anode bodies 1 and the part of the first terminal 13, and a surface which includes the cathode bodies 14 and the part of the second terminal 9 are cut by a method such as blade dicing or ultrasonic cutter.

Accordingly, the anode bodies 1 and the part of the first terminal 13 are exposed from the one surface of the sealing body 8, and similarly, the cathode bodies 14 and the part of the second terminal 9 are exposed from the other surface. Then, the first current collector 11a or the second current collector 11b is formed on the respective surface. The subsequent steps are the same as those of the first embodiment, and descriptions thereof are omitted.

Third Embodiment

Figure 3:
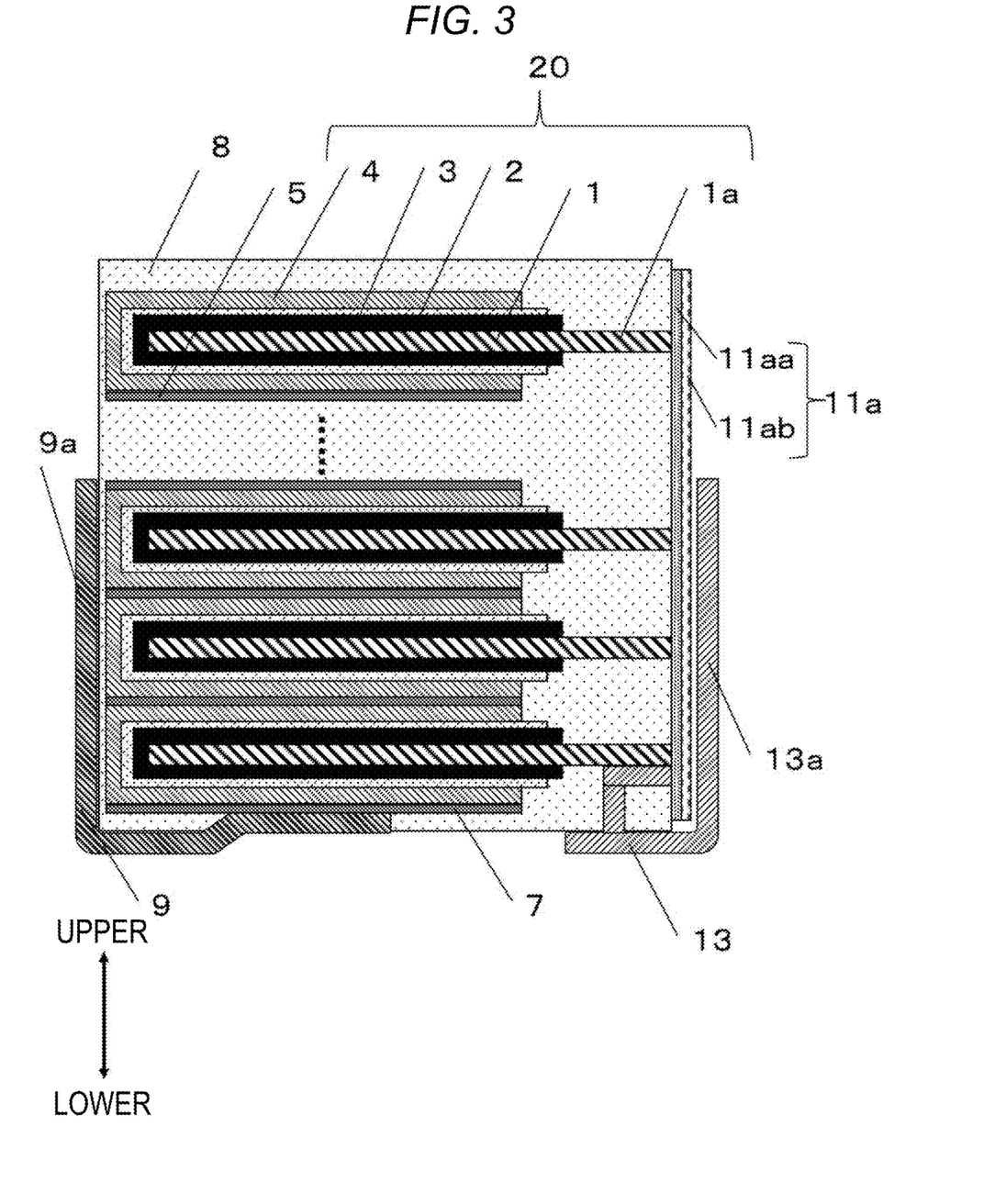
FIG. 3 is a cross section view of an electronic component according to a third embodiment of the disclosure.

FIG. 3 is a cross section view of an electronic component in a third embodiment of the disclosure. Matters not described are the same as those of the first embodiment and the second embodiment.

As shown in FIG. 3, the first current collector 11a has a two-layer structure including a current collector first layer 11aa and a current collector second layer 11ab. In the structure, a material of the current collector first layer 11aa is formed of, for example, a metal which includes any one of aluminum, nickel, copper, silver, gold, tin, palladium, and zinc, which are used as a wiring material of an electronic component. That is, the current collector first layer 11aa functions as a conductive layer.

The current collector second layer 11ab is a coating layer covering the current collector first layer 11aa, and is formed for the purpose of protecting the current collector first layer 11aa and improving various characteristics and reliability of the electronic component. The current collector second layer 11ab is a metal film or a resin film.

For example, a structure in which copper is used as the current collector first layer 11aa and nickel is used as the current collector second layer 11ab is considered. In this case, both the current collector first layer 11aa and the current collector second layer 11ab are formed by plating, and the current collector second layer 11ab formed of nickel covers the current collector first layer 11aa formed of copper to prevent oxidation of copper and improve reliability.

Further, a structure in which the current collector first layer 11aa is formed of aluminum and the current collector second layer 11ab is formed of epoxy resin is considered as another example. The aluminum of the current collector first layer 11aa is formed by cold spraying, and the resin layer of the current collector second layer 11ab is formed on the current collector first layer 11aa by dispensing and the like.

Accordingly, it is possible to prevent the current collector first layer 11aa from being exposed to outside air, to suppress a corrosion of the current collector first layer 11aa, and to improve the reliability of the electronic component. As described above, although various materials can be applied as the material of the current collector second layer 11ab in combination with the current collector first layer 11aa, in particular, aluminum, nickel, copper, silver, gold, tin, palladium, zinc, epoxy resin and silicone resin which are used as configuration materials of an electronic component are preferable.

An effect can be exhibited as long as thicknesses of the current collector first layer 11aa and the current collector second layer 11ab are 0.1 μm to 500 μm, and particularly about 3 μm to 100 μm is preferable.

It is possible to prevent an entry of water into the sealing body 8 and an oxidation of the first current collector 11a, and to obtain an effect of improving the reliability by forming the first current collector 11a into a plurality of layer structures in this manner. Since the structure and the manufacturing method other than that of the first current collector 11a are the same as those of the first embodiment, descriptions thereof are omitted.

Fourth Embodiment

Figure 4:
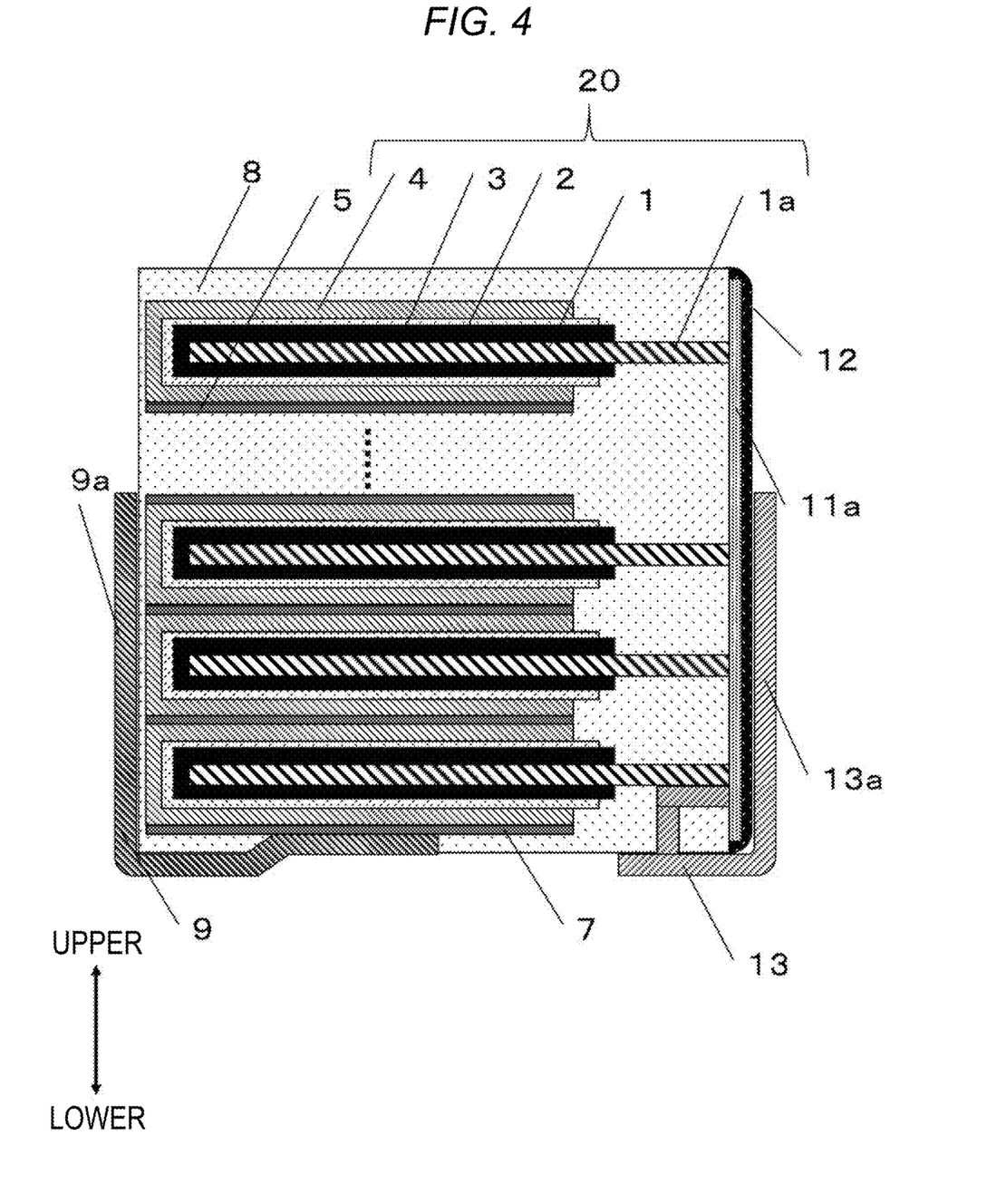
FIG. 4 is a cross section view of an electronic component according to a fourth embodiment of the disclosure.

FIG. 4 is a cross section view of an electronic component according to a fourth embodiment of the disclosure. Matters not described are the same as those of the first embodiment and the second embodiment.

As shown in FIG. 4, a filler 12 is filled in a vacant space between the first current collector 11a and the second portion 13a bent to a side surface in the fourth embodiment. The filler 12 has an effect of preventing the second portion 13a bent to the side surface from being deformed and coming into contact with the first current collector 11a, and improving the reliability of the electronic component.

For example, liquid silicone rubber may be used as the filler 12. After the first terminal 13 is bent, the first gap 10a between the first current collector 11a and the second portion 13a bent to the side surface is filled with the filler 12 by dispensing and the like.

Although the dispensing is used as an example, a method of filling the filler 12 is not particularly limited thereto, and a related-art resin supply method can be used.

Further, an elastic modulus of the filler 12 is preferably from 0.1 MPa to 100 MPa, and more preferably from about 1 MPa to 50 MPa.

Further, although a case where only the first gap 10a is filled with the filler 12 has been described in the fourth embodiment, in the electronic component according to the second embodiment, the first gap 10a or the second gap 10b may also be filled with the filler 12.

A thickness of the filler 12 is preferably from 10 μm to 1 mm in consideration of not to increase in size of the electronic component and the productivity and reliability of the electronic component. Since the structure and manufacturing method other than the filler 12 are the same as those of the first embodiment, descriptions thereof are omitted.

A structure of an electronic component according to the disclosure can reduce a stress transmitted to a connecting portion between a lead portion exposed from a sealing body and a current collector, and can realize high reliability together with reduction in size and large capacitance, and is useful for electronic components such as a capacitor and a battery.

What is claimed is:

1. An electronic component comprising:
   an electronic element that includes a lead portion;
   a sealing body that seals the electronic element in a state where an end portion of the lead portion is exposed;
   a first current collector that is formed at a first outer surface of the sealing body and is connected to the end portion; and
   a first terminal that includes a first portion which is sealed in the sealing body and is connected to the first current collector, and a second portion which is exposed from the sealing body, wherein
   the first portion includes a first part that has an end surface that is exposed at the first outer surface of the sealing body, the end surface being parallel to the first outer surface of the sealing body and being in direct contact with the first current collector and a second part that is connected to the first part and has an end that is exposed from a second outer surface of the sealing body, the first outer surface and the second outer surface being different surfaces,
   the second part of the first portion is connected to the second portion at the second outer surface, and
   the second portion is bent along the sealing body, extends to the first outer surface, and overlaps the first current collector to form a first gap between the second portion and the first current collector.

2. The electronic component according to claim 1, wherein the first current collector is formed on the first outer surface of the sealing body.

3. The electronic component according to claim 1, wherein the first current collector is formed of a metal which includes any one of aluminum, nickel, copper, silver, gold, tin, palladium, and zinc.

4. The electronic component according to claim 3, wherein the first current collector includes a conductive layer that is formed of the metal and is connected to the first portion, and a cover layer that covers the conductive layer.

5. The electronic component according to claim 1, wherein the second outer surface is a lower surface of the sealing body.

6. The electronic component according to claim 1, wherein a distance between the first current collector and the second portion is 10 μm or more and 1 mm or less.

7. The electronic component according to claim 1, wherein the first gap is a vacant space.

8. The electronic component according to claim 1, wherein the first gap is filled with a filler.

9. The electronic component according to claim 1, further comprising:
   a second current collector that is disposed at a position facing the first current collector with the sealing body interposed therebetween; and
   a second terminal that includes a third portion which is sealed in the sealing body and is connected to the second current collector, and a fourth portion which is exposed from the sealing body, wherein
   the fourth portion extends to a surface of the second current collector along the sealing body and overlaps the second current collector to form a second gap between the fourth portion and the second current collector, a space between a region of the second portion where the second portion connects to the second part and a region of the fourth portion where the fourth portion connects to the third portion face each other is a space without the sealing body, and the third portion and the fourth portion are connected at the second outer surface of the sealing body.

10. The electronic component according to claim 1, wherein the electronic element is a capacitor element including a dielectric layer, a solid electrolyte layer, and a cathode layer stacked on the lead portion.

11. The electronic component according to claim 1, wherein a plurality of the electronic elements are provided, and an end portion of each of the lead portions is connected to the first current collector.

12. The electronic component according to claim 11, wherein the plurality of electronic elements are laminated via a conductive adhesive.

13. The electronic component according to claim 1, wherein the first part is parallel to the lead portion.

14. The electronic component according to claim 1, wherein the second part is positioned vertically.

15. The electronic component according to claim 1, wherein the second part and the first current collector are parallel to each other.

16. The electronic component according to claim 1, wherein the first current collector is free from direct contact with the second portion.

17. The electronic component according to claim 1, wherein the first part and the second part are orthogonal to each other.

18. The electronic component according to claim 1, wherein all of the first part except for the end surface is contained within the sealing body.

19. The electronic component according to claim 1, wherein a connecting portion between the first portion and the second portion is covered with the sealing body.

20. The electronic component according to claim 1, wherein
the end surface of the first part of the first portion is in direct contact with a surface of the first current collector that contacts the first outer surface of the sealing body.

* * * * *